March 11, 1952  A. A. GALASSO  2,589,071
BATTERY HOLDER
Filed March 18, 1950
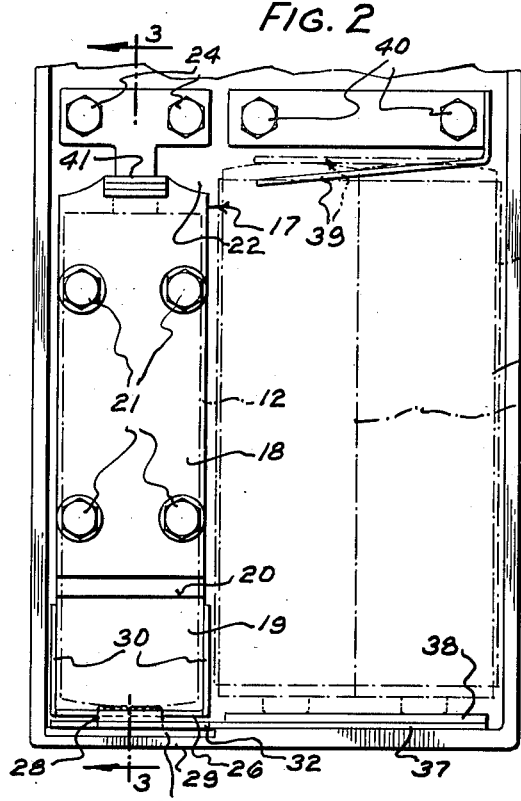
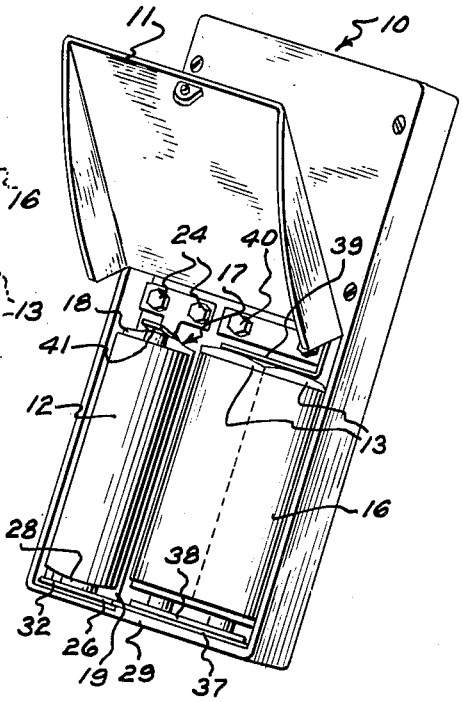
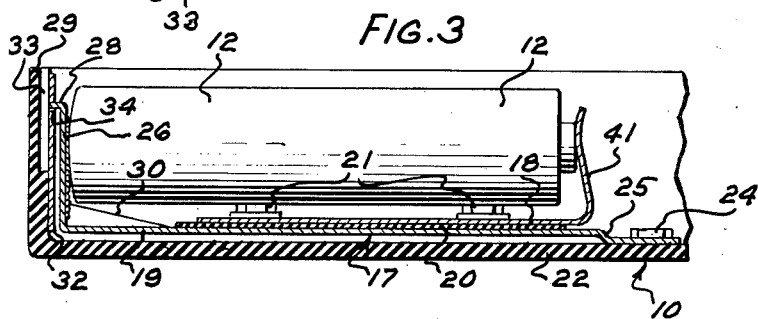
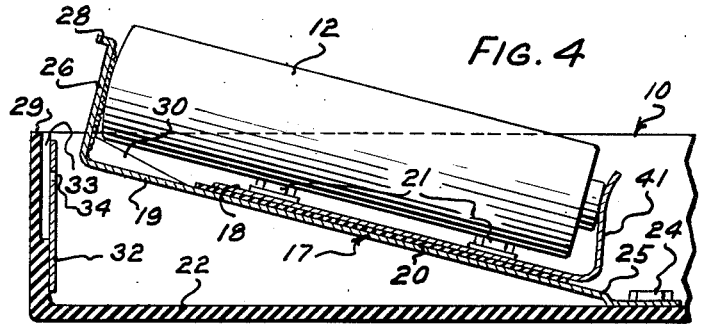
INVENTOR
A. A. GALASSO
BY
ATTORNEY Patented Mar. 11, 1952

2,589,071

UNITED STATES PATENT OFFICE 2,589,071

BATTERY HOLDER

Anthony A. Galasso, New York, N. Y., assignor to Western Electric Company, Incorporated, New York, N. Y., a corporation of New York Application March 18, 1950, Serial No. 150,451

9 Claims. (Cl. 136—173)

This invention relates to battery holders and more particularly to a battery holder for use with hearing aid devices.

An object of this invention is the provision of a simple and practicable holder for a battery compactly held in a case and which is effective to readily permit its removal therefrom.

In accordance with the above object, this invention contemplates, in one embodiment thereof, a battery holder or case for use with hearing aid devices, in which two dry cell battery units may be compactly held in a small case and from which the batteries may be readily removed. In this holder, one battery unit is supported by a holder comprising two fixed-together spring type contact plates insulated from each other and tiltable as a unit by actuating a latch which holds one end of the holder in a normal flexed position. When the holder is unlatched, it springs to a position where the one battery unit carried thereby may be readily removed, whereupon the other battery unit held between resilient and rigid contacts is readily accessible for removal.

Other objects and advantages of this invention will be apparent from the following detailed description taken in conjunction with the accompanying drawing, in which Fig. 1 is a perspective view of a battery case for a hearing aid equipped with one embodiment of the battery holder of this invention;

Fig. 2 is an enlarged fragmentary plan view of the battery containing end of the case;

Fig. 3 is a longitudinal vertical sectional view taken on the line 3—3 of Fig. 1, showing the battery holder in a latched position in the case; and Fig. 4 is a view similar to that of Fig. 3 with the battery holder in an unlatched position to permit a ready removal of the batteries from the case.

Referring now to the drawing, and particularly to Fig. 1, the numeral 10 indicates a conventional type hearing aid case having a hinged cover 11 at its lower end, shown in an open position, to expose small sized dry cell battery units 12 and 13 carried compactly in the case, which, for convenience, is made as small as practicable. The case 10 and its cover 11 are preferably made of insulating material. When such battery units are mounted in the positions shown in Figs. 1, 2 and 3 in a conventional type hearing aid case, not enough space is provided to permit a manual grip on either of the battery units to readily remove it. To remove the battery units in replacing them, it is necessary to resort to the use of a pointed or sharp tool or instrument to pry out one of the battery units, after which the other unit may be removed.

The battery unit 12 is termed the A cell, while the unit 13 comprises two cells, which are tied together by a surrounding cover 16, is termed the B cell. As shown in Fig. 3, the A battery unit 12 is carried on a holder indicated in general at 17, which includes spring contacts for opposite poles of the battery, the holder comprising two formed or L-shaped heat-treated beryllium copper spring members 18 and 19 insulated from each other by a thin separating sheet of phenol fabric 20 and secured together as a unit by rivet or screws or otherwise as indicated at 21—21. The spring member 19 at its right end, as shown in Fig. 3, or its upper end (Figs. 1 and 2), is T-shaped and the head of the T-formation is fixed to the bottom wall 22 of the case 10 by rivets or screws 24. At a point 25, where the spring member 19 joins the T-shaped end, it is offset approximately the thickness of the spring material to space it from the bottom wall 22 of the case 10 to permit a slight movement of the member 19 toward the bottom wall of the case.

The left end of the member 19 is formed with a substantially right angularly extending resilient battery contact arm 26 which terminates in a latching lip or detent 28 (Fig. 4) extending toward an adjacent end wall 29 of the case 10. Gusset portions 30 extend from opposite edges of the arm 26 of the member 19 to opposite edges of the main portion of the latter member to provide added stiffness to the arm. Secured in any suitable manner to the inner surface of the end wall 29 of the case 10 is a combined latching and spring contact plate 32, which is spaced from the surface of the wall at its upper end, as shown at 33, due to an upper portion of the wall being reduced in thickness, thus permitting the upper end of the plate 32, which is resilient, to be flexed outwardly into the space 33. Formed in the resilient portion of the contact plate 32 is a latching aperture 34, which is effective to receive the latching detent 28 when the resilient portion of the plate is in its normal position, shown in Fig. 3, and the holder 17 for the A battery unit 12 has been moved from its unflexed position, shown in Fig. 4, to its flexed position, shown in Fig. 3.

The combined latching and contact plate 32 also serves as a rigid connector plate for the B battery unit 13 by being extended across the end wall 29 of the case 10, as indicated at 37 (Figs. 1 and 2). Secured with the plate 32 to the end wall 29 of the case 10 is an outer rigid contact plate 38 for the adjacent ends of each of the B batteries comprising the unit 13. A resilient contact plate and arm 39 engages the upper ends (Figs. 1 and 2) of the B batteries and is fixed to the bottom wall 22 of the case 10, in line with the head of the T-formation on the spring member 19 by screws or rivets 40—40.

At its right end (Figs. 3 and 4), the spring member 18 of the holder 17 terminates in a narrowed angularly disposed resilient contact arm 41, with which the end of the A battery of the unit 12 is engaged.

When it is desired to remove and replace the battery units 12 and 13, shown in Fig. 1, from the case 10, the cover 11 being open, it is merely necessary, referring particularly to Fig. 3, to flex the spring contact plate 32 towards the left away and from the latching detent 28 on the battery contact arm 26 of the holder or carriage 17. Upon thus being unlatched, the battery holder 17 springs to the angular unflexed position shown in Fig. 4, in which position the battery unit 12 may be readily withdrawn from between the contact arms 26 and 41 by manually gripping the same and without the use of a tool. After the removal of the battery unit 12, the holder 17 may be pressed back to its latched and flexed position (Fig. 31), whereupon the battery unit 13 may be easily removed from between the contact plate 38 and contact arm 39.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a case for a battery powered hearing aid, a box-like walled cavity for receiving a battery, a holder for said battery having a resilient portion fixed to a wall of said cavity and having its battery holding portion normally urged about its fixed resilient portion to raise an end of the battery out of the cavity, a latch portion formed on one end of said holder, and means fixed to another wall of said cavity for cooperating with the latch portion to hold the battery in the holder wholly within the cavity.

2. In a case for a battery powered hearing aid, a box-like walled cavity for receiving a battery, a holder for said battery comprising a pair of united members insulated from each other, one of said members having a resilient portion fixed to a wall of said cavity, said holder having resilient contact arms for engaging opposite poles of the battery and having its battery supporting portion normally urged about its fixed resilient portion to raise an end of the battery out of the cavity, a latch portion on one end of said holder, and resilient means fixed to another wall of said cavity having a latching aperture for cooperating with the latch portion to hold the battery in the holder wholly within the cavity.

3. In a case for a battery powered hearing aid, a box-like walled cavity for receiving a plurality of batteries in closely juxtaposed relation, a holder for one of said batteries having a resilient portion fixed to a wall of said cavity and having resilient contact arms insulated from each other for engaging opposite poles of the battery and having its battery supporting portion normally urged about its fixed resilient portion to raise an end of the battery out of the cavity, a latch portion formed on one end of said holder, and resilient means fixed to another wall of said cavity for cooperating with the latch portion to hold the battery in the holder wholly within the cavity.

4. In a case for a battery powered hearing aid, a box-like walled cavity for receiving a plurality of batteries, a resilient holder for one of said batteries having a portion fixed to a wall of said cavity and having its battery holding portion normally urged to raise an end of the battery out of the cavity, a latch element formed on one end of said holder, and means fixed to another wall of said cavity for cooperating with the latch element to hold said battery in the holder wholly within the cavity.

5. In a case for a battery powered hearing aid, a box-like walled cavity for receiving a plurality of batteries in closely juxtaposed relation, a holder for one of the batteries formed to partially enclose said one battery, resilient means for urging a portion of said holder to extend from said cavity, a latch element formed on one end of said holder, and means cooperating with said element to hold the holder wholly within the cavity.

6. In a battery holder, a container, a composite battery support and a spring clip battery contact holder comprising a pair of angularly shaped members insulated from each other, means for securing said insulated members together to form a U-shaped battery holder, an end portion of one of said members being secured to a wall of said container, said end portion being normally disposed at an angle to the member, an angularly disposed battery contact arm on the other of said members adjacent said secured end portion of said first member, a plate fixed to another wall of said container adjacent the opposite end of said first member and having a resilient portion spaced from said latter wall and having a latching aperture, and an angularly disposed battery contact arm on the opposite end of said first member having a detent latchable into said aperture when said holder is flexed about the secured end of said first member.

7. In a battery holder, a container, a composite battery support and spring clip battery contact holder comprising a pair of angularly shaped members insulated from each other and integrally united to form a U-shaped battery holder, an extension on one end of one of said members normally resilient disposed at an angle to the member, means for securing said extension to a wall of said container, an angularly disposed battery contact arm on the other of said members adjacent said secured end of said first member, a plate fixed to a wall of said container disposed at an angle to said first wall adjacent the opposite end of said first member and having a resilient portion spaced from said latter wall and formed with a latching aperture, and an angularly disposed battery contact arm on the opposite end of said first member having a detent latchable into said aperture when said holder is flexed about the secured end of said first member whereby, upon flexing said resilient plate portion away from said detent, said holder is released and tilts to an unflexed position.

8. In a battery holder, a container, a composite battery support and spring clip contact battery holder comprising a pair of L-shaped members insulated from each other, means for securing said insulated members together to form a U-shaped battery holder, an extension on one end of one of said members secured to a wall of said container, said extension being normally resiliently disposed at an angle to the member, an angularly disposed battery contact clip on the other of said members adjacent said secured end of said first member, a plate fixed to another wall of said container adjacent the opposite end of said first member and having a resilient portion spaced from said latter wall and formed with a latching aperture, and an angularly disposed battery contact clip on the opposite end of said first member having a detent latchable into said aperture when said holder is flexed about the secured end of said first member and, upon flexing said resilient plate portion away from said detent, said holder is released and tilts to an unflexed position.

9. In a battery holder, a container, a U-shaped battery holder comprising a pair of angularly shaped spring members insulated from each other and integrally united, a battery contact arm on each of said members, one at each end of said holder for engaging opposite terminals of a battery, an angular extension on one end of one of said members secured to the wall of said container for normally maintaining said holder in an unflexed angular position with respect to a bottom wall of the container, a plate fixed to a wall of said container disposed at an angle to said first wall adjacent said battery contact arm disposed opposite to the secured extension on said holder, said plate having a resilient portion spaced from its supporting wall and a latching aperture therein, and a detent on said latter battery contact arm latchable into said aperture when said holder is flexed about its secured end whereby, upon flexing said resilient plate portion away from said detent, said holder is released and tilts to its unflexed position.

ANTHONY A. GALASSO.

REFERENCES CITED

The following references are of record in the file of this patent:

UNITED STATES PATENTS

| Number | Name | Date |
| --- | --- | --- |
| 2,205,316 | Stratton | June 18, 1940 |
| 2,495,476 | Posen et al. | Jan. 24, 1950 |

FOREIGN PATENTS

| Number | Country | Date |
| --- | --- | --- |
| 390,802 | Great Britain | Apr. 6, 1933 |
| 480,194 | Great Britain | Feb. 18, 1938 |